US009749598B2

United States Patent
Richardson et al.

(10) Patent No.: US 9,749,598 B2
(45) Date of Patent: *Aug. 29, 2017

(54) REMOTE VISUAL AND AUDITORY MONITORING SYSTEM

(71) Applicant: WELL CHECKED SYSTEMS INTERNATIONAL LLC, Tulsa, OK (US)

(72) Inventors: Roy Stephen Richardson, Prague, OK (US); Michael Dean Haines, Stroud, OK (US); Samuel H. Haines, Tulsa, OK (US)

(73) Assignee: Well Checked Systems International LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/337,797

(22) Filed: Oct. 28, 2016

(65) Prior Publication Data
US 2017/0064256 A1 Mar. 2, 2017

Related U.S. Application Data

(63) Continuation of application No. 14/493,049, filed on Sep. 22, 2014, now Pat. No. 9,482,086.

(60) Provisional application No. 61/883,482, filed on Sep. 27, 2013.

(51) Int. Cl.
| | |
|---|---|
| *G01V 3/00* | (2006.01) |
| *H04N 7/18* | (2006.01) |
| *E21B 47/12* | (2012.01) |
| *E21B 41/00* | (2006.01) |
| *E21B 44/00* | (2006.01) |
| *E21B 47/00* | (2012.01) |
| *E21B 19/16* | (2006.01) |
| *H04N 5/232* | (2006.01) |
| *H04N 5/76* | (2006.01) |

(52) U.S. Cl.
CPC ........... *H04N 7/183* (2013.01); *E21B 19/165* (2013.01); *E21B 41/00* (2013.01); *E21B 44/00* (2013.01); *E21B 47/00* (2013.01); *E21B 47/12* (2013.01); *H04N 5/23203* (2013.01); *H04N 5/76* (2013.01)

(58) Field of Classification Search
CPC ........ E21B 19/165; E21B 41/00; E21B 44/00; E21B 47/00; E21B 47/12; E21B 47/0002; G06K 9/00718; G06T 7/20; H04N 5/2252; H04N 5/23212; H04N 5/23293
See application file for complete search history.

(56) References Cited

U.S. PATENT DOCUMENTS

2010/0250139 A1* 9/2010 Hobbs ................... E21B 47/12
702/6

\* cited by examiner

*Primary Examiner* — Omeed Alizada
(74) *Attorney, Agent, or Firm* — Hovey Williams LLP

(57) ABSTRACT

A well site remote monitoring system comprises a monitoring station, a number of recording devices, a number of sensors, a processor, and a power source. The monitoring station supports the recording devices, processor, and power source thereon and is positioned at a strategic location at a well site so that the recording devices can create video, audio, or other recordings of points of interest of the well site. The processor controls the recording devices and uploads the recordings to a remote server computer for storage and so that an operator can manage and view the recordings on a remote monitoring computer.

20 Claims, 6 Drawing Sheets

Fig. 4.

REMOTE VISUAL AND AUDITORY MONITORING SYSTEM

RELATED APPLICATIONS

The present application is a regular utility non-provisional continuation application and claims priority benefit, with regard to all common subject matter, of earlier-filed U.S. Non-Provisional patent application Ser. No. 14/493,049, titled "REMOTE VISUAL AND AUDITORY MONITORING SYSTEM", filed Sep. 22, 2014. Application Ser. No. 14/493,049 claims priority benefit, with regard to all common subject matter, of earlier-filed U.S. Provisional Patent Application Ser. No. 61/883,482, titled "REMOTE VISUAL AND AUDITORY MONITORING SYSTEM", filed Sep. 27, 2013. The identified earlier-filed applications are hereby incorporated by reference in their entireties into the present application.

BACKGROUND

The present invention relates to a system, method, and computer program for remotely monitoring a well site.

Well sites are often monitored remotely via SCADA (Supervisory Control and Data Acquisition). However, SCADA requires a monitored well site to have sensors and gauges installed in or on the well components for data acquisition. This level of integration entails complicated and cost-prohibitive installation steps and is often not feasible for isolated, old, or unconventional well sites. Well sites are also often dissimilar, which prevents the reuse of any single SCADA setup. Also, SCADA collects performance and status data but does not provide site safety and site security data.

SUMMARY

The present invention solves the above-described problems and provides a distinct advance in the art of well site monitoring. More particularly, the present invention provides a system, method, and computer program for remotely monitoring a well site, drilling site, or other industrial site via visual and auditory data collection, transmission, and review.

An embodiment of the present invention is a well site remote monitoring system that comprises a monitoring station, a number of recording devices, a number of sensors, a processor, and a power source.

The monitoring station houses and/or supports the recording devices, the processor, and the power source in a strategic location at the well site and may be a stand-alone tripod frame or any other suitable structure. The monitoring station provides an optimal vantage point for the recording devices to focus on points of interest around the well site.

The recording devices record video, audio, or other data and may include a camera, camcorder, microphone, or any other suitable recording device. The recording devices are positioned at or near a top of the monitoring station for an optimal view of the points of interest.

The sensors detect the occurrence of certain events or criteria that may need to be monitored and may include motion sensors, infrared sensors, heat sensors, or any other suitable sensor. The sensors are placed in predetermined locations around the well site for detecting the events or criteria.

The processor performs algorithms for managing and controlling the above devices and for manipulating and routing the data being transmitted between the devices. The processor is mounted on the monitoring station or positioned elsewhere on the well site.

The power source powers the recording devices, the sensors, and/or the processor and may be a solar panel mounted on the monitoring station or any other suitable electric power source.

Embodiments of the present invention may be used with a number of remote server computers and a number of remote monitoring computers communicating with each other and with the processor over a wired or wireless communication network. The remote server computers may be operated by or for a company that provides well site remote monitoring system installation and support and stores monitoring recordings and other data for a number of well sites. The remote monitoring computers may be operated by an operator (i.e., a user who monitors well sites), well owner, pumper, or other users to remotely view and/or review monitoring videos, pictures, and other data via a computer application (described below), website, or computer program.

Embodiments of the invention may also include a computer application for managing and viewing the recordings on the remote monitoring computers. The application may include a graphical user interface that includes buttons, input boxes, and other user inputs and executable code for implementing the functions of the invention. For example, the executable code includes code segments for inviting new users to become associated with a predetermined well site and for a well site owner to create and manage more than one well site, videos, and other data associated with each well site. The executable code also includes code segments for entering comments, notes, and alerts for managing the videos, and for setting or changing parameters of the well site remote monitoring system. The executable code further includes code segments for allowing the operator to start a live video session, and control the recording devices.

In use, the recording devices create video, audio, or other recordings of points of interest at the well site periodically, upon the occurrence of a trigger event or criteria, and/or on demand. The processor uploads the recordings and related data to the remote server computers for storage thereon via the wired or wireless communication network. The operator or other user then manages and/or views the recordings via the application on one of the remote monitoring computers. The operator may also assume manual control of the recording devices via the application and view the points of interest in real time.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 4 is a screen display of a graphical user interface of an application of the well site remote monitoring system;

Figure 1:
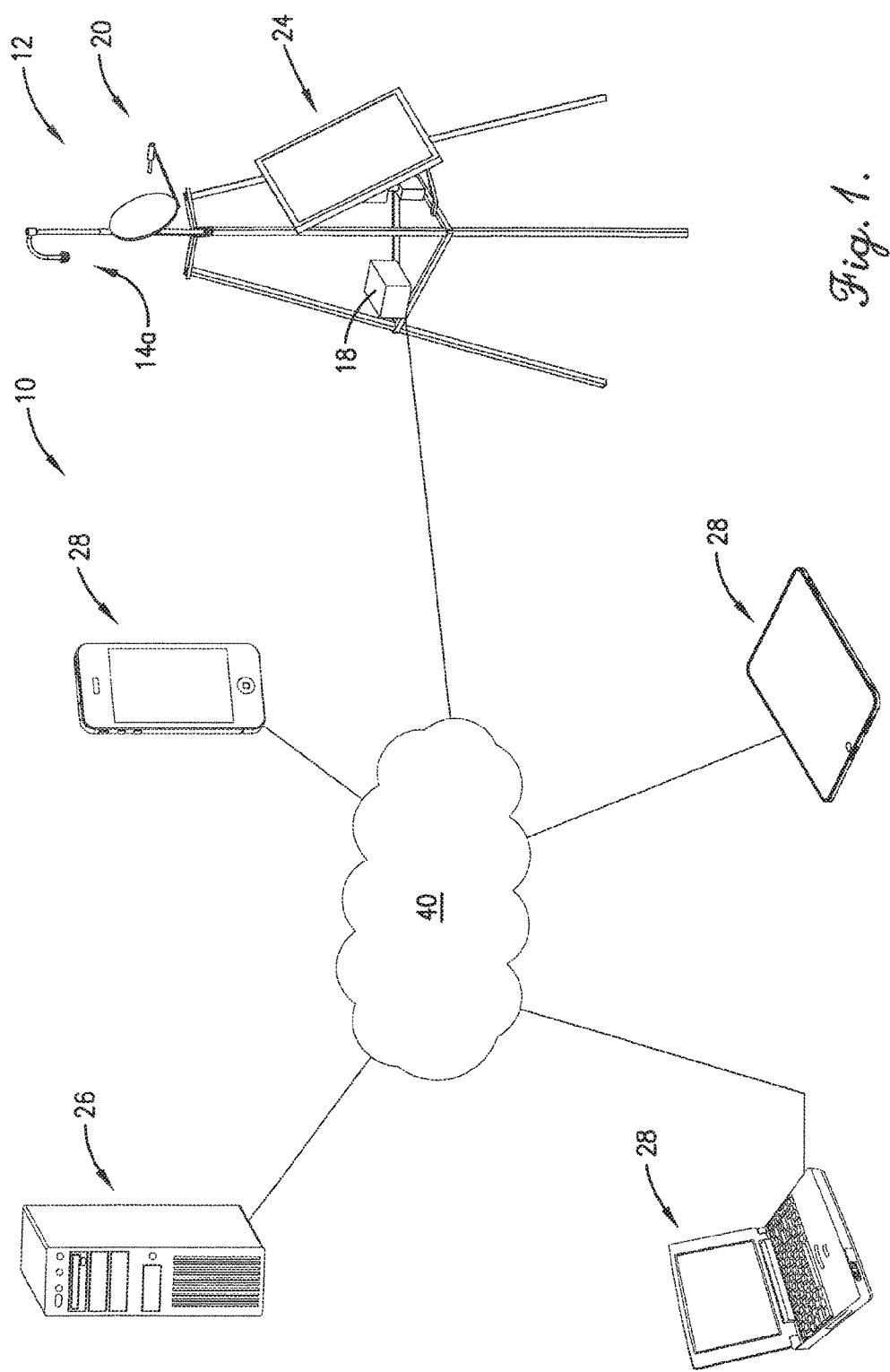
FIG. 1 is a schematic view of a well site remote monitoring system constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to one embodiment", an embodiment", or "embodiments" mean that the feature or features being referred to are included in at least one embodiment of the technology. Separate references to one embodiment", an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Aspects of the present invention may be at least partially implemented with a well site remote monitoring system 10 broadly referred to by the numeral 10 in FIG. 1. The well site remote monitoring system 10 includes a monitoring station 12, a number of recording devices 14a-c, a number of sensors 16a-c, a processor 18, a communication component 20, a kill box 22, a power source 24, one or more remote server computers 26, one or more remote monitoring computers 28, and a remote monitoring computer application.

Figure 3:
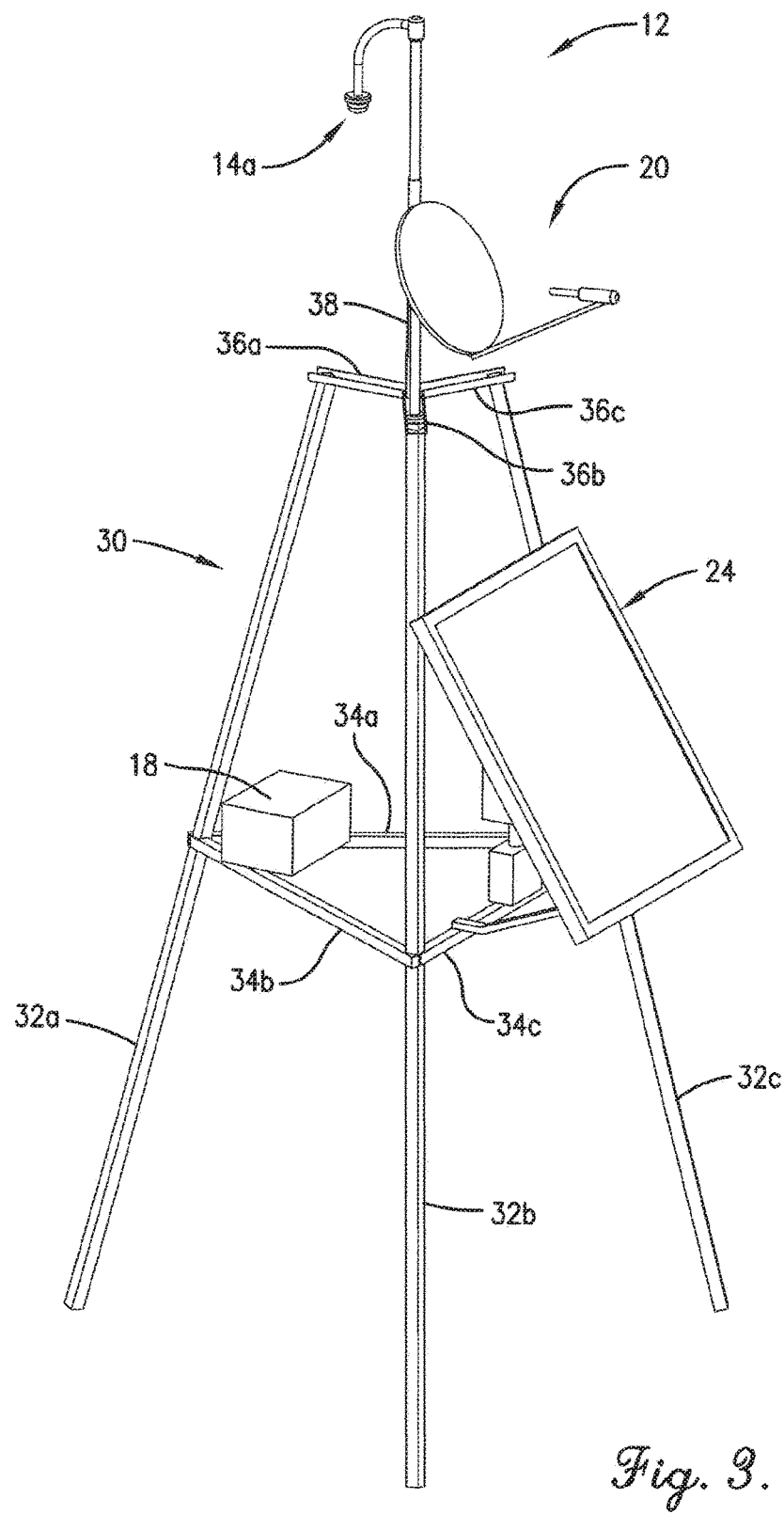
FIG. 3 is a perspective view of the monitoring station of FIG. 1.

The monitoring station 12 houses and/or supports one or more of the recording devices 14a-c, the processor 18, and the communication component 20 at a well site 100 and may be a stand-alone frame, a scaffold, a tower, a mount, or any other suitable structure. In one embodiment, the monitoring station 12 is a stand-alone frame 30 having a number of support legs 32a-c, a number of middle cross members 34a-c, a number of top cross members 36a-c, and a vertical top member 38, as shown in FIG. 3.

The stand-alone frame 30 may be a permanent, temporary, or portable structure and may be formed of a single piece or a number of pieces that can be collapsed or disassembled. The stand-alone frame 30 may be formed of steel, aluminum, titanium, or any other suitable material. The stand-alone frame 30 is between approximately three meters to approximately six meters tall so as to elevate the recording devices 14a-c for providing an improved vantage point and improved reception. The stand-alone frame 30 may be anchored in or fixed to the ground for withstanding high winds and other weather.

The support legs 32a-c may be one inch or one and three-fourths inch square tubing or similar and may be held in place by welding or self-tapping screws, bolts, clamps, or similar hardware. The support legs 32a-c extend outwardly to the ground at approximately a fifteen degree angle for providing a more sturdy base area. The support legs 32a-c may be oriented in the same orthogonal direction so that sides of the square tubing are aligned for mounting solar panels and the like thereto.

The middle cross members 34a-c connect to the support legs 32a-c approximately halfway up the support legs 32a-c and may be approximately sixty inches to approximately seventy-eight inches from the ground when the stand-alone frame 30 is erected. The middle cross members 34a-c may be notched at their ends for butting up to the support legs 32a-c and being secured thereto with self-tapping screws or other similar hardware.

The top cross members 36a-c connect to the support legs 32a-c near the top of the support legs 32a-c and support the vertical top member 38 at a central point. The top cross members 36a-c may each be a three inch C-channel approximately sixteen inches long.

The vertical top member 38 extends above the top cross members 36a-c for mounting at least one of the recording devices 14a-c thereon. This reduces interference from the frame 30 and from the other devices. The vertical top member 38 may be formed of one and three-fourths inch square tubing inserted into a two inch square tubing sleeve.

The recording devices 14a-c record video, audio, and other data of points of interest around the well site 100 and may include a camera, a camcorder or other video recording device, a heat scanner, a sound recorder such as a microphone, an ultrasonic device, SONAR, RADAR, LiDAR, or any other suitable device capable of capturing information. For example, recording device 14a may be a camera positioned near the top of the monitoring station 12 in a central and optimal vantage point. The camera may be covered by a dark dome for being concealed. The recording device 14b may be a microphone positioned near a point of interest, on or near the camera, or at another optimal location. The microphone may be wireless and directional so as to pick up sound waves over a large distance (e.g. ten to one hundred meters). The microphone may be integral with or separate from the camera, and as such, may be operated independently from the camera. The recording device 14c may be a second or alternative microphone that senses vibration.

The sensors 16a-c detect the occurrence of certain events or criteria that may need to be monitored, as described below, and may be heat, infrared, ultrasonic, microwave, tomographic, or other suitable sensors placed in predetermined locations around the well site 100 such as near a well, a gate, a main road, or an access-way. The sensors 16a-c include a communication component for communicating with the processor 18, as described below.

The processor 18 controls the recording devices 14a-c and communicates with the sensors 16a-c, the kill box 22, the remote server computers 26, and/or the remote monitoring computers 28 over a wired or wireless communication network 40 (described below). The processor performs algorithms for managing and controlling the above devices and for manipulating and routing the data between the devices. The processor 18 is mounted on the monitoring station 12 or located elsewhere on the well site 100. The processor 18 may comprise computing devices, servers, databases, and communications networks to facilitate the functions and features described herein. The computing devices and servers may comprise any number and combination of processors, controllers, integrated circuits, programmable logic devices, or other data and signal processing devices for carrying out the functions described herein, and may additionally comprise one or more memory storage devices, communication components, and/or communication busses for communicating with the various devices of the system. In various embodiments of the invention, the computing devices may comprise a memory element, a communication component, a display, and/or a user interface.

In embodiments of the invention, the processor 18, computing devices and/or databases may implement a computer program and/or code segments of the computer program to perform some of the functions described herein. The computer program may comprise a listing of executable instructions for implementing logical functions in the user device. The computer program can be embodied in any computer readable medium for use by or in connection with an instruction execution system, apparatus, or device, and execute the instructions. In the context of this application, a "computer readable medium" can be any means that can contain, store, communicate, propagate, or transport the program for use by or in connection with the instruction execution system, apparatus, or device. The computer readable medium can be, for example, but not limited to, an electronic, magnetic, optical, electro-magnetic, infrared, or semi-conductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), and combinations thereof. The various actions and calculations described herein as being performed by or using the computer program may actually be performed by one or more computers, processors, or other computational devices, independently or cooperatively executing portions of the computer program.

The communication component 20 receives and transmits signals between the recording devices 14*a*-*c*, the sensors 16, the processor 18, the remote server computers 26, and/or the remote monitoring computers 28. The communication component 20 may be a transceiver mounted near the top of the vertical top member 36 of the monitoring station 12 for improved signal reception or may be a cable or wire connector.

The kill box 22 shuts down a well or well component at the well site 100 when a critical event occurs or other condition is met, as described below. The kill box 22 includes a control or integrated processor that opens a relay, thus removing power from the well or other system. The kill box 22 may be wired or wirelessly linked to the processor 18, remote server computers 26, or remote monitoring computers 28.

The power source 24 powers the devices on the monitoring station 12 and may include solar panels mounted on the monitoring station 12 (FIG. 3), 120V or 240V power provided by the well site 100, and/or wind power. The power source 24 may also include a power control panel, a battery charger, and rechargeable batteries.

The remote server computers 26 are provided for storing videos, pictures, and other data captured by the recording devices 14*a*-*c* and include an off-site server or group of servers (e.g., the "cloud") including a computer readable medium and other computer components for storing the data thereon. The remote server computers 26 may each store only a portion of the data or that each store independent copies of the data. The remote server computers 26 store the data remotely for up to approximately six months.

Embodiments of the remote server computers 26 may include one or more servers running Windows; LAMP (Linux, Apache HTPP server, MySQL, and PHP/Perl/Python); Java; NT; Novel Netware; Unix; Mac OS; or any other software system. The remote server computers 26 include or have access to computer memory and other hardware and software for receiving, storing, accessing, and transmitting information via the communication network 40, as described below. The remote server computers 26 may also include conventional web hosting operating software, searching algorithms, and an Internet connection, and are assigned URLs and corresponding domain names so that they can be accessed via the Internet in a conventional manner.

The remote monitoring computers 28 may be any devices used by the operator, well owner, pumper, or other users for monitoring one or more well sites via the computer application (described below). The remote monitoring computers 28 may be any type of mobile smartphone, handheld device, tablet, laptop computer, or portable gaming system. The remote monitoring computers 28 each include a touch screen display or a similar screen with button inputs and further include computing hardware, software, memory, and transmitting and receiving hardware and software. The remote monitoring computers 28 each preferably include or can access an Internet browser and a conventional Internet connection such as a wireless broadband connection, DSL converter, or ISDN converter so that it can receive communications from the remote server computers 26 via the communication network 40, as described below.

The wired or wireless communication network 40 connects the processor 18 (via the communication component 20), the remote server computers 26, and the remote monitoring computers 28 and may be the Internet, a local area network, a wide area network, an intranet, or a "Wi-Fi", cellular, satellite, 3G, 4G, DSL, cable, or other wired or wireless network connection including a pre-existing connection. The wireless communication network 40 may include or be in communication with a wireless network capable of supporting wireless communications such as the wireless networks operated by AT&T, Verizon, or Sprint. The communication network 40 may also be combined or implemented with several different wired or wireless networks.

The components of the well site remote monitoring system 10 illustrated and described herein are merely examples of equipment that may be used to implement embodiments of the present invention and may be replaced with other equipment without departing from the scope of the present invention. Some of the illustrated components of the system 10 may also be combined or switched and/or may be operated by the same or any persons or entities. For example, the aspects of the present invention performed with the remote server computers 26 may be performed with the remote monitoring computers 28 and/or the processor 18 and vice versa. Similarly, the remote server computers 26 and the remote monitoring computers 28 may be operated by any persons or entities. For example, the remote server computers 26 may be operated by a system administrator, and the remote monitoring computers 28 may be operated by an operator (i.e., a user who monitors well sites), well owner, pumper, or other users.

The computer application includes a graphical user interface 42 for the operator, well owner, pumper, or other users to view and manage recorded data and to manage multiple well sites. The graphical user interface 42 includes virtual buttons, menus, other inputs, images, textboxes, and other displays, as described below.

Figure 2:
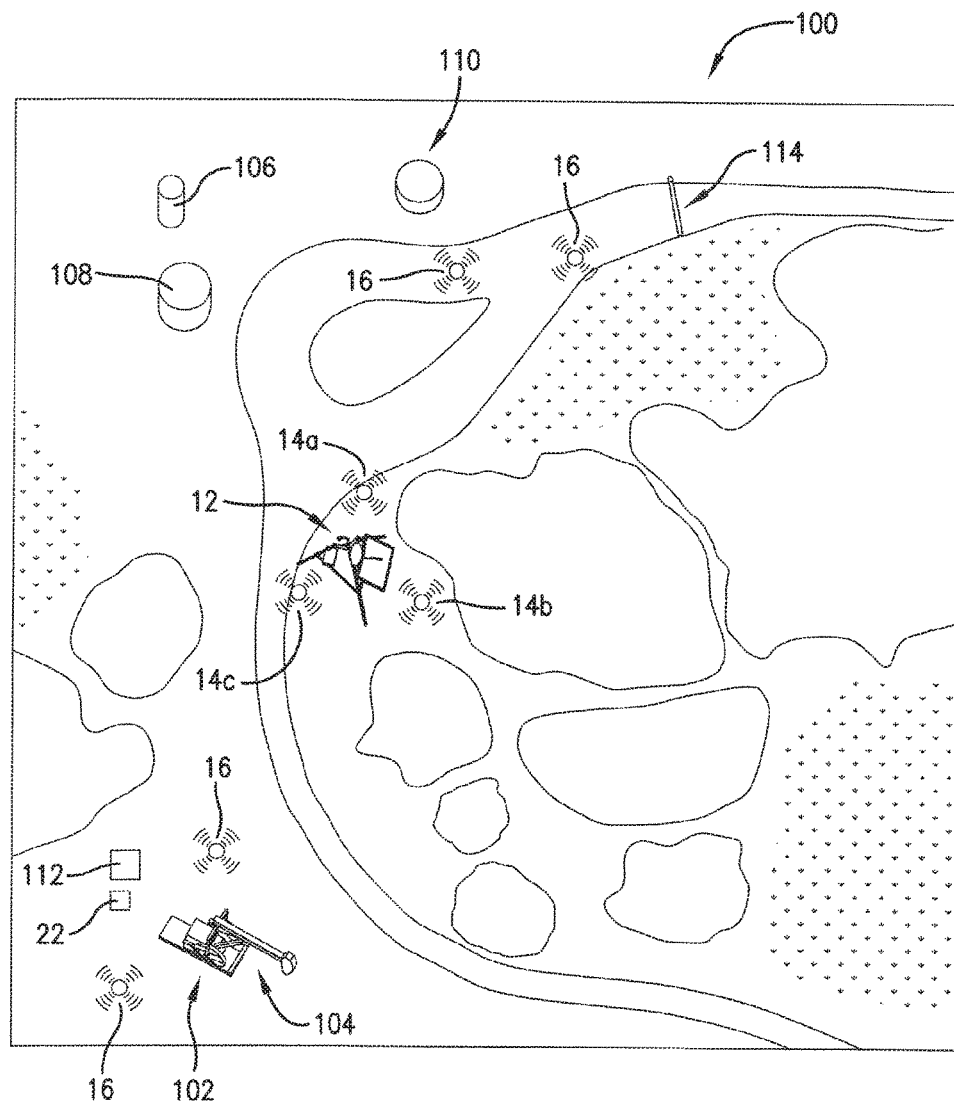
FIG. 2 is a plan view of the well site remote monitoring system of FIG. 1 at a well site.

The well site remote monitoring system 10 may be installed on one or more well sites, drilling sites, or other industrial sites. Old, unconventional, or isolated well sites such as well site 100 especially benefit from the features of the present invention. The well site 100 may have a number of components such as a well head 102, a pump jack 104, a vertical separator 106, a water tank 108, an oil tank 110, a main control 112, and a gate 114, as shown in FIG. 2. The well site components are often separated by tens or hundreds of meters and may have trees, rocks, dirt roads, and rough terrain between them. The sensors 16a-c are positioned at strategic locations around the well site 100 such as near the well head 102, gate 114, and other points of interest. The monitoring station 12 is positioned at a strategic location such as a clearing or central location that provides a clear vantage of the points of interest. For example, the recording devices 14a-c should have unobstructed lines of sight from the top of the monitoring station 12 to the points of interest.

Operation of the remote well site monitoring system 10 will now be described in more detail. The well site monitoring system 10 collects visual and auditory data of the well site components and other points of interest via the recording devices 14a-c. For example, the recording device 14a (e.g., a video camera) records high resolution videos and images by zooming in to focus on a point of interest having small details such as the numbers on a gauge, the position of a valve, or a possible tank leak. The recording device 14a may capture a short (e.g., one to five second) video or may capture a still image once the point of interest is in focus. The recording device 14a may zoom out to record a wider area at once and may also pan and tilt to increase its recording range. In this way, a number of well components may be recorded via a single recording device by first zooming into a point of interest on one well component and moving and zooming into a second point of interest in a different direction and at a different distance. For example, the recording device 14a may first focus on a well head southwest of the recording device 14a and forty meters away and then focus on a water tank northwest of the recording device 14a and thirty-four meters away. The recording device 14a may utilize "pre-event" recording, wherein the recording device 14a records and locally saves video data up to thirty seconds long. The pre-event video data is discarded periodically and replaced with new pre-event video data. If an event/incident occurs, such as the sensors 16a-c sensing motion, the pre-event video data leading up to the time of the event is saved and uploaded along with video data recorded as a result of the triggered event. In this way, important video data of the source of the incident may be captured before one of the sensors 16a-c activates the recording device 14a.

The well site remote monitoring system 10 uses three primary data collection modes: periodic recording, incident recording, and manned live viewing. In periodic recording, a PTZ (pan, tilt, zoom) "guard tour" is pre-set to collect data from various components once per a predetermined cycle time, such as approximately thirty minutes to approximately one hour. For example, the processor 18 may instruct the recording device 14a to move from a home position and focus on a first point of interest, record approximately three to approximately five seconds of video data of the first point of interest, then move, focus, and record approximately three to approximately five seconds of video data of the second point of interest, and so on. The processor 18 may instruct the recording device 14a to move or return to various starting points, midpoints, endpoints, and home positions. Each recording is indexed with metadata such as date and time, point of interest, and well site. The processor 18 receives the recording created by the recording device 14a and the corresponding metadata and routes the data and metadata to the communication component 20 for transmitting the recording and metadata to the remote server computers 26 via the communication network 40.

In incident recording, one of the recording devices 14a-c is activated when one of the sensors 16a-c senses movement or a signal is received from an accompanying SCADA (Supervisory Control And Data Acquisition) system. An incident may be an intruder trespassing, an unwanted animal roaming on the site, a leak, an explosion, or another malfunction. In such an event, an alert is generated and transmitted to the operator or other user indicating an incident is occurring. One of the recording devices 14a-c is instructed to focus in a pre-set direction or on a well component or an area in which the incident is occurring in an attempt to provide visual or auditory documentation and to mitigate the incident. The recording device 14a continues to record until instructed to stop recording. Any recording or image data is recorded and stored locally and/or uploaded in real time to the remote server computers 26.

In manned live video, the operator may remotely control one of the recording devices 14a-c to obtain video or audio data on any section or point of interest of the well site 100. The data is streamed virtually instantaneously to one of the remote monitoring computers 28 so that the operator may monitor the well site 100 in real time.

At any time, and regardless of the data collection mode in use, the kill box 22 may receive an instruction from the operator to shut down the well or other well component by opening the relay so as to cut power to the well or well component. The kill box 22 may also automatically shut down the well or well component when a predetermined condition is reached such as a high tank pressure or a predetermined ambient pressure.

The processor 18 uploads the recorded data to the remote server computers 26 via the communication component 20 and the communication network 40. Because the periodically recorded data is short in duration or includes still frames or other small files and is generated only once every approximately thirty minutes, the well site remote monitoring system 10 uses only approximately 2-5 GB of bandwidth per month during routine operation. Uploading incident data collection mode data to the remote server computers 26 may take approximately 250 MB per month (for still images or other small data files), which is low enough for utilizing mobile broadband 3G or 4G technology. If the operator utilizes the live video feed data collection mode, bandwidth usage increases an additional approximately 24 GB per month. For cameras recording in high definition (HD) quality, bandwidth usage may increase an additional approximately 60 GB per month. However, general use of the well site remote monitoring system 10 should require approximately 3 GB per month and may utilize as little as 56 kb modem speeds. As can be appreciated, data may be uploaded less or more frequently than once every approximately thirty minutes.

Uploading recorded data to the remote server computers 26 is performed in small portions to minimize bandwidth and so that the operator may view some of the files or data on one of the remote monitoring computers 28 as the files are uploaded. This allows the operator to view videos closer to "real time" and to more quickly address issues that arise. If a network connection is unavailable, the files or data are stored locally on the processor 18 until the network connection is restored.

The remote server computers 26 store the recorded data remotely from the well site 100 for up to six months. If the user makes a comment regarding a video file or other data file or an alert associated with a data file is generated (as described below), the file is saved indefinitely or for the life of the agreement between the user and the server owner.

Data collection routines, other parameters, and settings of the recording devices 14a-c such as periodic cycle times and video lengths may be hardcoded or hardwired such that the recording devices 14a-c are ready to be used when installed. The parameters may also be set or changed via limited access by the installer (optionally by request of the client). Alternatively, the parameters and settings may be set or changed by an administrator or other designated user via the application (described below).

Figure 4:
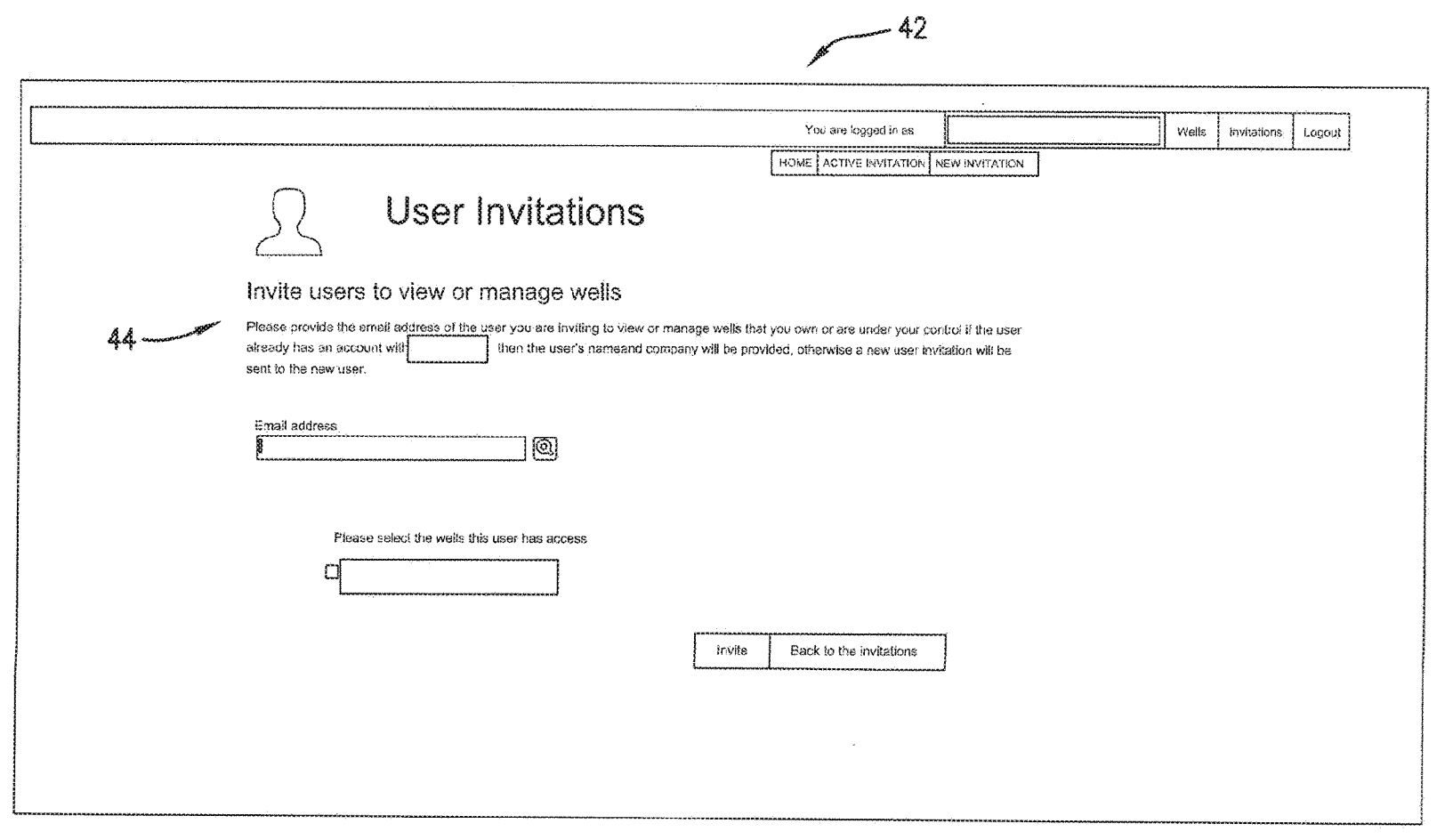
Figure 5:
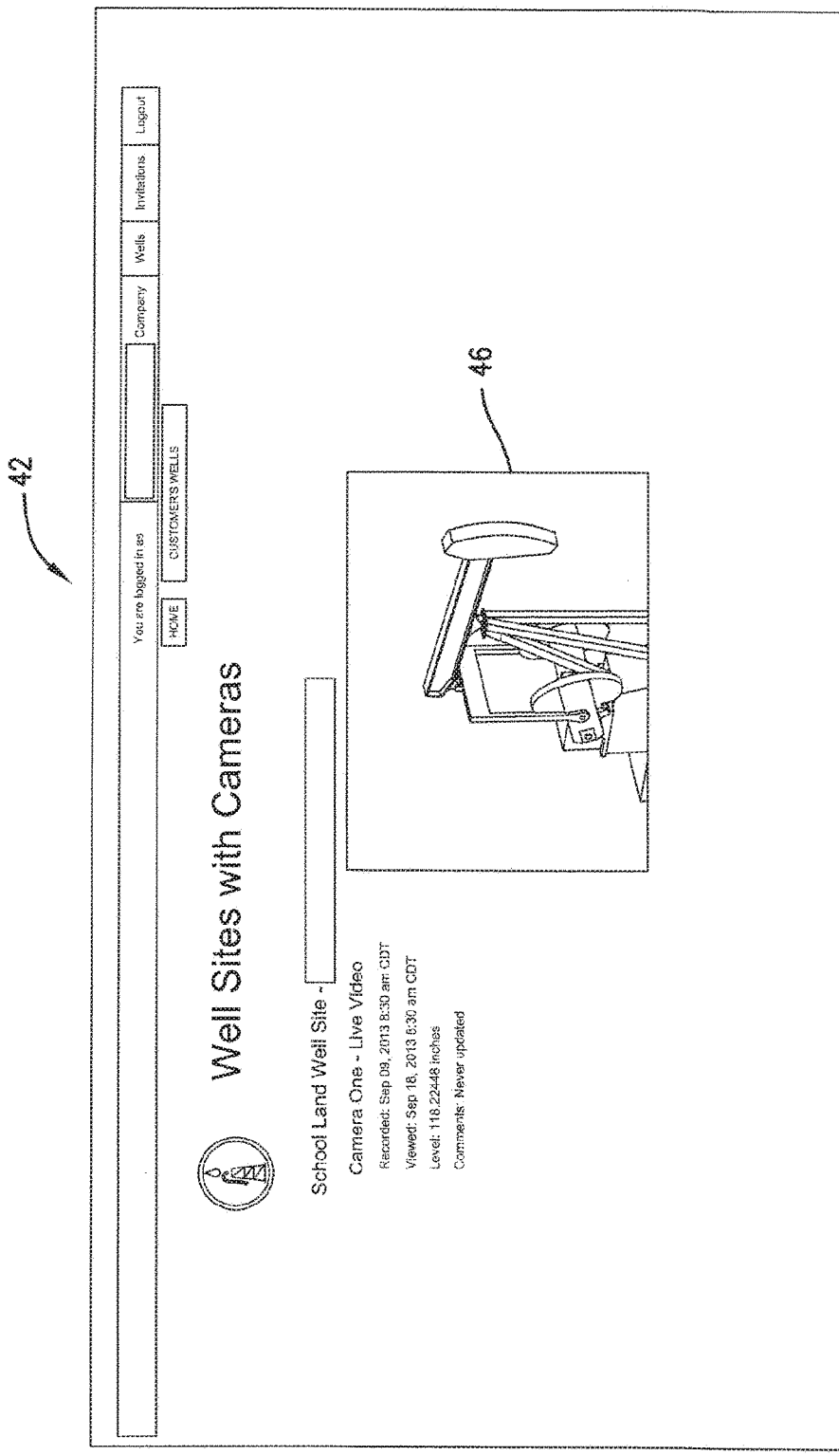
FIG. 5 is another screen display of the graphical user interface of FIG. 4.
Figure 6:
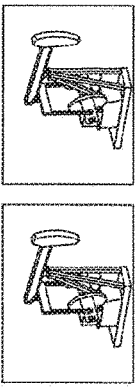
FIG. 6 is another screen display of the graphical user interface of FIG. 4.

Turning to FIGS. 4-6, operation of an application that allows an operator or other user to manage and view well site recordings on one of the remote monitoring computers 28 will now be described in detail. A new user may be invited to use or install the application and to become associated with a predetermined well site by an invitation 44 sent from another user via the new user's email address, as shown in FIG. 4. The invitation 44 is received in the new user's email or message inbox. The invitation 44 includes a hyperlink for the new user to select which directs the new user to a website for downloading and installing the application. Alternatively, the invitation 44 may include a downloadable application file for installing on the user's device. Once opened, the application provides a new user profile creator for the new user to create or input a username, a password, security questions and answers, and an email address for receiving alerts or additional correspondences. Once the user has created a profile, the application allows the user to log in and review data of the preselected well site. The user may be invited to view additional well sites by accepting additional invitations from other users. Thus, at any time, the user may have access to data for one or more well sites. The application allows the user to invite other new users to use the application or current users to be associated with a well site with which the user is associated.

The application allows a well site owner to create a well site profile via an administrator (i.e., a user designated for managing well site information). The administrator may invite other users to be associated with the well site. The application provides each well site with an invitation list associated with it. Thus, a well site may be accessible to multiple operators (i.e., users who monitor well sites), well site owners, pumpers, administrators, and producers. Users may thus be associated with multiple well sites of various owners.

The user may switch between well sites by selecting a well site from a drop down menu or an equivalent selector, as shown in FIG. 5. When a well site is selected, the application displays the name of the well site, the company that owns the well site, and a still frame 46 of a video of the most recent periodic tour. Alternatively, the application may automatically begin playing the video. The application may also display metadata of the displayed video including a camera identifier (e.g., "Camera One"), the date and time of the video recording, a date and time that the video was first or last viewed, tank levels etc. taken at the time of recording, and any comments (described below). The user may view the most recent video by clicking on the still frame 46 or a "play" button. The user may input comments related to the recorded data for future reference. The comments are fully searchable. For example, the user may input comments for multiple wells regarding possible leaks. The user may later wish to fix all of the leaks. The user searches for the word "leak" and the application retrieves all of the videos with comments that have the word "leak" in them. The comments may also be organized by date or by well site. The application may also have an alert section that lists all of the alerts or only the most current alerts associated with the displayed well site. The alerts may be searched and may be divided by category such as "security" and "well site performance".

The camera identifier may be a selectable link, which provides a list or array of "thumbnails" of additional videos recorded by the camera, in chronological or reverse chronological order. The list or array also displays the time of recording and various SCADA readings (if the well site is integrated with a SCADA system) made at the time of recording. The list or array may display all of the videos for the present or selected day at once, as shown in FIG. 6. The user may repopulate the list with videos from a different day by selecting a date from a drop down menu. The videos may be searched from the previous 90 days to the present day.

The application also displays a link for the user to begin a live video session. The live video session may be displayed within the application or may be opened in a new applet. In a live video session, the application allows the user to control one of the recording devices 14a-c for selective viewing of the well site 100. In this way, the user may view the well site 100 in real time since the live video is streamed to the application. The application also allows the user to switch between the preset "snap-to" viewing locations for quickly viewing points of interest in real time.

The application provides a button or other input for the user to activate the kill box 22 if the user determines that the well site 100 should be shut down. When the button is pressed, the application sends a signal to the processor 18 on the well site 100 which in turn instructs the kill box 22 to open the relay. The application may also indicate to the user that the well site 100 is shutting down or that the well site 100 has successfully shut down. The application may also open a live video session for the user to monitor the well site 100 while it is shutting down. Alternatively, the application may display additional videos recorded at the time of shut down for the user to review.

As mentioned above, the application may allow the administrator or a designated user to set or change parameters of the well site remote monitoring system 10. For that purpose, the application provides an interface including virtual buttons, input boxes, slides, radio buttons, drop down menus, etc. for modifying the parameters. For example, the administrator may wish to reposition the recording device 14a if the well has become out of frame. As another example, the administrator may wish to increase the camera periodic cycle time from thirty minutes to one hour to conserve bandwidth.

The above-described well site remote monitoring system 10, method, and computer application provide several advantages over conventional remote monitoring systems.

For example, the well site remote monitoring system 10 can be easily installed on any well site without disassembling or connecting to any of the well components. The well site remote monitoring system 10 collects well site information as well as safety and security information. The processor 18 can be easily reprogrammed to alter the routines and functions of the recording devices 14*a-c* and can operate the recording devices 14*a-c* in periodic recording, incident recording, and manned live viewing modes. The sensors 16 allow the processor 18 to alert the operator to certain incidences and other issues. The kill box 22 allows the operator or the processor 18 to shut down the well site upon dangerous conditions. The processor 18 uploads videos and other data sporadically or conservatively to ensure transmission over limited bandwidth. In addition, the application allows one operator or well owner to monitor more than one well site.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for remotely monitoring a well site, the system comprising:
   a monitoring station;
   a video camera mounted on the monitoring station for creating a video recording of well site information;
   a processor for:
      instructing the video camera to create the video recording according to a predetermined recording routine; and
      transmitting signals representative of the video recording to a remote server computer for storage and for allowing a user to view the video recording on a remote monitoring computer,
      the processor being configured to instruct the video camera to collect the video recording in the following data collection modes:
      periodic recording, wherein the processor instructs the video camera to start a recording once per predetermined cycle time, focus on a first point of interest, focus on a second point of interest, and stop recording;
      incident recording, wherein the processor instructs the video camera to focus in the direction of an incident and stop recording if the incident has ceased; and
      live viewing, wherein the processor allows the user to remotely control the video camera via a computer application on the remote monitoring computer.

2. The system of claim 1, further comprising a sensor configured to be positioned near a well component of the well site, the processor being further configured to instruct the video camera to create the video recording when the sensor senses a predetermined event.

3. The system of claim 2, wherein the sensor is a motion sensor, infrared sensor, or heat sensor.

4. The system of claim 2, wherein the processor is further configured to initiate the incident recording mode when the sensor detects the incident.

5. The system of claim 1, further comprising a kill box configured to shut down a well component of the well site when a critical condition has been met.

6. The system of claim 1, further comprising a solar panel for providing power to the processor and the recording devices.

7. The system of claim 1, wherein the monitoring system is a stand-alone frame.

8. The system of claim 7, wherein the stand-alone frame comprises three legs.

9. The system of claim 8, wherein the stand-alone frame further comprises three middle cross members connected between the legs, three top cross members connected between tops of the legs, and a vertical top member extending upwards from the top cross members.

10. The system of claim 9, wherein the video camera is mounted to a top of the vertical cross member so as to have an optimal vantage point.

11. A method for remotely monitoring a well site, the method comprising the steps of:
   operating a recording device in a periodic recording mode in which a processor instructs the recording device to start a first recording, focus on a first point of interest, and stop the first recording;
   operating the recording device in an incident recording mode in which the processor instructs the recording device to focus in a direction of an incident, start a second recording, and stop the second recording if the incident has ceased;
   operating the recording device in a live viewing mode in which the processor receives remote control instructions from a user and instructs the recording device to start a third recording according to the remote control instructions; and
   instructing the processor to upload at least one of the first recording, second recording, and third recording to the remote server computer for providing access to at least one of the first recording, second recording, and third recording via a computer application on a remote monitoring computer.

12. The method of claim 11, further comprising instructing the processor to index one of the first recording, second recording, and third recording with metadata identifying a time of recording and a point of interest being recorded.

13. The method of claim 12, further comprising instructing the processor to provide access to additional recordings and order and present the first recording, second recording, third recording, and additional recordings according to the metadata.

14. The method of claim 11, further comprising instructing the processor to instruct the recording device to focus on a second point of interest in the periodic recording mode.

15. The method of claim 11, further comprising instructing the processor to instruct the recording device to start the first recording once per a pre-determined cycle time.

16. The method of claim 11, further comprising instructing the processor to instruct the recording device to start the second recording upon detection of the incident.

17. The method of claim 11, further comprising instructing the processor to instruct the recording device to start the third recording upon receiving a manual input from the remote monitoring computer.

18. The method of claim 11, further comprising instructing the processor to upload the recordings to the remote server computer in portions such that bandwidth usage is minimized.

19. The method of claim 11, further comprising instructing the processor to shut down a well component when a critical event occurs.

20. A method for remotely monitoring a well site, the method comprising the steps of:

operating a recording device in a periodic recording mode in which a processor instructs the recording device to start a first recording once per a pre-determined cycle time, focus on a first point of interest, focus on a second point of interest, and stop the first recording;

operating the recording device in an incident recording mode in which the processor instructs the recording device to focus in a direction of an incident, start a second recording, and stop the second recording if the incident has ceased;

operating the recording device in a live viewing mode in which the processor receives remote control instructions from a user and instructs the recording device to start a third recording according to the remote control instructions;

instructing the processor to index at least one of the first recording, second recording, and third recording with metadata identifying a time of recording and a point of interest being recorded;

instructing the processor to upload at least one of the first recording, second recording, and third recording to a remote server computer in portions such that bandwidth usage is minimized for providing access to at least one of the first recording, second recording, and third recording via a computer application on a remote monitoring computer; and instructing the processor to automatically shut down a well component of the well site when a critical event occurs.

* * * * *